United States Patent
Willis

(10) Patent No.: US 8,813,181 B2
(45) Date of Patent: Aug. 19, 2014

(54) ELECTRONIC VERIFICATION SYSTEMS

(76) Inventor: Taun Eric Willis, Avondale, AZ (US)

( * ) Notice: Subject to any disclaimer, the term of this patent is extended or adjusted under 35 U.S.C. 154(b) by 547 days.

(21) Appl. No.: 11/369,668

(22) Filed: Mar. 6, 2006

(65) Prior Publication Data

US 2006/0200855 A1 Sep. 7, 2006

Related U.S. Application Data

(60) Provisional application No. 60/659,390, filed on Mar. 7, 2005, provisional application No. 60/722,690, filed on Sep. 30, 2005.

(51) Int. Cl.
*H04L 29/06* (2006.01)

(52) U.S. Cl.
USPC ........ 726/2; 726/22; 726/26; 726/27; 726/28; 726/29

(58) Field of Classification Search
USPC ................................. 726/2, 22, 26, 27, 28, 29
See application file for complete search history.

(56) References Cited

U.S. PATENT DOCUMENTS

| | | | |
|---|---|---|---|
| 5,892,900 A | 4/1999 | Ginter et al. | |
| 6,834,110 B1 | 12/2004 | Marconcini et al. | |
| 7,203,838 B1* | 4/2007 | Glazer et al. ................. | 713/176 |
| 2001/0013021 A1 | 8/2001 | Saito | |
| 2002/0053035 A1* | 5/2002 | Schutzer ..................... | 713/202 |
| 2002/0143704 A1 | 10/2002 | Nassiri | |
| 2002/0174067 A1 | 11/2002 | Hoffman et al. | |
| 2003/0009435 A1 | 1/2003 | Gopalan | |
| 2003/0023878 A1 | 1/2003 | Rosenberg et al. | |
| 2003/0070101 A1 | 4/2003 | Buscemi | |
| 2003/0158960 A1 | 8/2003 | Engberg | |
| 2004/0014457 A1 | 1/2004 | Stevens | |
| 2004/0117322 A1 | 6/2004 | Bjorksten et al. | |
| 2004/0117376 A1* | 6/2004 | Lavin et al. .................. | 707/10 |
| 2004/0123162 A1 | 6/2004 | Antell et al. | |
| 2004/0128502 A1 | 7/2004 | Royer | |
| 2004/0139050 A1 | 7/2004 | Barrett et al. | |
| 2004/0187013 A1 | 9/2004 | Heath et al. | |
| 2004/0230538 A1 | 11/2004 | Clifton et al. | |
| 2004/0236838 A1 | 11/2004 | Tout | |
| 2004/0243518 A1 | 12/2004 | Clifton et al. | |
| 2005/0086161 A1 | 4/2005 | Gallant | |
| 2005/0097037 A1 | 5/2005 | Tibor | |

(Continued)

OTHER PUBLICATIONS

Tradesafely.com, miscellaneous tradesafely.com website pages, approximately Feb. 2003, 5 pages.

(Continued)

*Primary Examiner* — Cordelia Zecher
*Assistant Examiner* — Sarah Su
(74) *Attorney, Agent, or Firm* — Andrew P. Lahser

(57) ABSTRACT

A verification system which can be used over electronic networks, such as the Internet, to help prevent phishing, electronic identity theft, and similar illicit activities, by verifying the authenticity of electronic entities (for example, websites). Users and electronic entities register with an authenticating entity. The authenticating entity shares an encryption method with registered electronic entities and establishes a secret code for each registered electronic entity. The secret code is combined with other information and encrypted before being transmitted over the network to ensure that the secret code cannot be compromised. Also disclosed are systems for virtual token devices, which provided object-based authentication without a physical device. Also disclosed are dynamic media credentials, which display nearly-unique behavior, previously specified and known to a user, to assist in verifying the authenticity of the presenter.

10 Claims, 10 Drawing Sheets

(56) References Cited

U.S. PATENT DOCUMENTS

| | | | |
|---|---|---|---|
| 2005/0097320 A1 | 5/2005 | Golan et al. | |
| 2005/0100166 A1* | 5/2005 | Smetters et al. | 380/277 |
| 2005/0125686 A1 | 6/2005 | Brandt | |
| 2005/0144449 A1 | 6/2005 | Voice | |
| 2005/0144450 A1 | 6/2005 | Voice | |
| 2005/0144451 A1 | 6/2005 | Voice | |
| 2005/0154601 A1 | 7/2005 | Halpern et al. | |
| 2006/0129797 A1* | 6/2006 | Durfee et al. | 713/2 |
| 2007/0162961 A1* | 7/2007 | Tarrance et al. | 726/5 |
| 2009/0300749 A1* | 12/2009 | Delia et al. | 726/12 |
| 2010/0191972 A1* | 7/2010 | Kiliccote | 713/172 |
| 2010/0293017 A1* | 11/2010 | Merritt et al. | 705/7 |
| 2011/0138179 A1* | 6/2011 | Jiang et al. | 713/168 |
| 2013/0097486 A1* | 4/2013 | Miller | 715/237 |

OTHER PUBLICATIONS

Passmark Security, LLC, "Protecting Your Customers from Phishing Attacks", whitepaper, Feb. 22, 2004, unpublished.

Glenbrook Partners, LLC, "Rethinking Online Marketing", whitepaper, 2004, unpublished.

Carl Eric Wolrath, "Secure Electronic Tansaction", Masters Degree thesis, Sep. 27, 1998, Uppsala University Division of Computer Science, other publication details unknown.

IBM, "SET Securt Electronic Transaction Specification", before Sep. 1998, further publication details unknown.

Federal Deposit Insurance Corporation, "Putting an End to Account-Hijacking Identity Theft", study findings, Dec. 14, 2004, further publication details unknown.

* cited by examiner

ELECTRONIC VERIFICATION SYSTEMS

CROSS REFERENCE TO RELATED APPLICATIONS

The present application is related to prior provisional application Ser. No. 60/659,390, filed Mar. 7, 2005, the contents of which are incorporated herein by this reference and are not admitted to be prior art with respect to the present invention by the mention in this cross-reference section. The present application is related to prior provisional application Ser. No. 60/722,690, filed Sep. 30, 2005, the contents of which are incorporated herein by this reference and are not admitted to be prior art with respect to the present invention by the mention in this cross-reference section.

FEDERALLY SPONSORED RESEARCH

Not Applicable.

SEQUENCE LISTING OR PROGRAM

Not Applicable.

BACKGROUND

This invention relates to providing a system for verifying the authenticity of entities on a network.

"Phishing" is the fastest growing form of identity theft. Phishing is typically facilitated through the use of fake websites, called "phishing websites", designed to trick website visitors into divulging confidential information such as login IDs, passwords, etc. Phishing results in both financial and brand name losses; and the financial services industry has suffered great losses. Experts believe phishing is having the effect of "slowing the growth of online banking and commerce" because of eroding consumer confidence in the authenticity of financial and e-commerce websites.

In 2003, the FDIC reported U.S. financial losses attributed to phishing exceeded five billion U.S. dollars. The Federal Trade Commission reported that 2 million U.S. Internet users experienced some form of phishing-related fraud during the 12-month period ending April 2004.

Phishing usually involves luring web users to respond to fake/counterfeit email or spam, which is often designed to appear as genuine correspondence from a bank, financial institution or other reputable online business. Phishing may also include ensnaring users to visit a phishing website. Since the phishing website may be a nearly identical copy of the actual website, the user will then willingly, but unwittingly, provide his login credentials which will be captured by the phishing website. This information will then be later used by the phisher to fraudulently derive benefit of the account information. Victims of such scams may be unaware that any phishing has occurred because the phishing website will redirect the user to the actual website using the login credentials previously supplied by the user.

Phishers have many other methods of fooling web users. These methods include the following.

Altering DNS records to redirect traffic intended for the authentic website to the phisher's website. This is also known as DNS poisoning, DNS spoofing or sometimes pharming.

Phishers can also spam emails which contain hyperlinks that use the domain name of the targeted website but use the IP addresses of the phisher's website; and phishers rely on at least a portion of the recipients to not check the ownership of the IP address.

Phishers may design spam email containing many hyperlinks to the targeted website, but just a few to the phisher's website, for example, the link to post the username and password. Most users will not notice that only a few of the links actually point to the phisher's website.

Phishers can develop viruses, spyware or other programs that can be inadvertently loaded onto a user's computer and manipulate the local DNS software by, for example, entering a DNS record that will cause that particular user's web browser to connect to the phishing website whenever the user attempts to connect to the targeted website.

Phishers can register common typos of the domain name owned by the targeted website, and when someone inadvertently incorrectly types the domain name, they will be presented with a nearly identical phishing website.

Phishers can use multi-byte encoding techniques, such as Unicode, to make the hyperlink URL appear to point to the targeted website, however, it actually will send the user to the phisher's website. This technique is sometimes known as IDN spoofing.

Phishers can use features and programming inconsistencies in the user's web browser to cause the address bar of the web browser to display the website of the targeted website, but the content display in the browser is from the phisher's website. One particularly difficult type of phishing attack is called the "man in the middle" attack. In this type of phishing attack, the user is lured to a phishing website. The user is prompted for their credentials. The phisher then acts as a proxy and passes the credentials on to the targeted website. Any response that the user expects from the true targeted website may be passed back to the user by the phisher who again will act as a proxy. This method of phishing is difficult to prevent. Other techniques are constantly being developed, and this list is not exhaustive of the techniques and methods that phishers use to trick users into providing credentials that prove their identity.

Despite such prevalent tactics, there has not yet been developed a system for adequately protecting users and authentic website businesses against fraudulent transacting exemplified in the above types.

OBJECTS AND FEATURES OF THE INVENTION

A primary object and feature of the present invention is to overcome the above-mentioned problems. Another object and feature of the present invention is to prevent phishing and pharming. It is a further object and feature of the present invention to help prevent account hijacking and frustrate fraudulent electronic transactions.

Another primary object and feature of the present invention is to reassure users of electronic transactions that they are dealing with a trusted party. It is a primary object and feature of the present invention to prevent electronic identity theft.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a verification system, related to assisting at least one user to verify authenticity of at least one electronic-entity, comprising the steps of: assisting, during at least one first registration period, at least one authenticating entity to store shared, among such at least such one electronic entity and such at least one authenticating entity, first identification information about such at least one electronic entity, such first identification information comprising at least one first public portion associated with at least one first secret portion; assisting, during at least one second registration period, such at least one authenticating entity to store shared, among such at least such one user and such at least one authenticating entity, second identification information about such at least one user, such second identification information comprising at least one second public portion associated with at least one second secret portion; verifying authenticity of such at least one electronic entity using at least one shared, among such at least one electronic entity and such at least one authenticating entity, cryptographic algorithm. Moreover, it provides such a verification system wherein such step of verifying authenticity comprises the steps of: such at least one user electronically transmitting such at least one second public portion through at least one electronic network to such at least one electronic entity; such at least one electronic entity creating at least one first message digest by encrypting, using such cryptographic algorithm, data comprising such at least one first secret portion and such at least one second public portion; and such at least one electronic entity transmitting such at least one first message digest to such at least one authenticating entity. Additionally, it provides such a verification system wherein such step of verifying authenticity further comprises the steps of: such at least one electronic entity transmitting such at least one first public portion and such at least one second public portion to such at least one authenticating entity; such at least one authenticating entity looking up such at least one first secret portion associated with such at least one first public portion; such at least one authenticating entity creating at least one second message digest by encrypting, using such cryptographic algorithm, data comprising such at least one first secret portion, and such at least one second public portion. Also, it provides such a verification system wherein such step of verifying authenticity further comprises the step of such at least one authenticating entity comparing such at least one first message digest to such at least one second message digest. In addition, it provides such a verification system wherein such step of verifying authenticity further comprises the step of notifying such at least one user of the result of the authenticity verification of such at least one electronic entity. And, it provides such a verification system wherein such step of verifying authenticity further comprises the step of such at least one authenticating entity transmitting such at least one second secret portion to such at least one user. Further, it provides such a verification system wherein such step of verifying authenticity further comprises the steps of: such at least one authenticating entity transmitting such at least one second secret portion to such at least one user; wherein such at least one second secret portion comprises at least one authentic codeword. Even further, it provides such a verification system wherein such step of verifying authenticity further comprises the step of such at least one authenticating entity transmitting to such at least one user at least one bogus codeword. Even further, it provides such a verification system wherein such step of verifying authenticity further comprises the step of such at least one authenticating entity transmitting to such at least one user a plurality of bogus codewords. Even further, it provides such a verification system wherein such step of verifying authenticity further comprises the step of such at least one authenticating entity transmitting to such at least one user a plurality of lists comprising bogus codewords. Even further, it provides such a verification system wherein such step of verifying authenticity further comprises the step of such at least one user identifying such at least one authentic codeword. It provides the steps of: creating a dynamic media using such an aspect of a user; and transmitting such a dynamic media to such a user; wherein such a second secret portion further includes such an aspect. It provides the steps of: allowing a authenticating entity to verify authenticity of such a user using a portion of such a second identification information; providing a token to such a user, wherein such a token includes a result of such a shared cryptographic algorithm; and assisting such a electronic entity to verify authenticity of such a user using such a token and such a shared cryptographic algorithm; wherein such a second identification information further includes a hardware identifier and a password. It provides the steps of: prohibiting such a electronic entity from storing any information that identifies such a user; and preventing such a authenticating entity from storing any information that identifies such a user. It provides wherein such step of verifying authenticity further includes the step of such a authenticating entity transmitting such a second secret portion to such a user. It provides the steps of: creating a dynamic media using such an aspect of a user; and transmitting such a dynamic media to such a user; wherein such a second secret portion further includes such an aspect. It provides the steps of: verifying authenticity of such a user using such a second identification information; providing a token to such a user, wherein such a token includes a result of such a shared cryptographic algorithm; and assisting a electronic entity to verify authenticity of such a user using such a token and such a shared cryptographic algorithm; wherein such a second identification information further includes a hardware identifier and a password.

In accordance with another preferred embodiment hereof, this invention provides a verification system, related to assisting at least one user to verify authenticity of at least one electronic-entity, comprising: first registering means for, during at least one first registration period, assisting at least one authenticating entity to store shared, among such at least such one electronic entity and at least such one authenticating entity, first identification information about such at least one electronic-entity, such first identification information comprising at least one first public portion, and at least one first secret portion; second registering means for, during at least one second registration period, assisting such at least one authenticating entity to store shared, among such at least such one user and at least such one authenticating entity, second identification information about such at least one user, such second identification information comprising at least one second public portion and at least one second secret portion; verification means for supporting authentication of such at least one electronic entity comprising at least one shared, among such at least such one electronic entity and at least such one authenticating entity, cryptographic algorithm.

In accordance with another preferred embodiment hereof, this invention provides a verification system, related to assisting at least one user to verify authenticity of at least one electronic-entity, comprising: at least one first database for storing shared, among such at least such one electronic entity and at least such one authenticating entity, first identification information about such at least one electronic entity, such first identification information comprising at least one first public portion, and at least one first secret portion; at least one second database for storing shared, among such at least such one user and at least such one authenticating entity, second identification information about such at least one user, such second identification information comprising at least one second public portion and at least one second secret portion; at least one first processor for encrypting such at least one first secret portion, such at least one second public portion, and at least one timestamp, to create at least one first message digest; at least one second processor for encrypting such at least one first secret portion, such at least one second public portion, and at least one timestamp, to create at least one second message digest.

In accordance with another preferred embodiment hereof, this invention provides a verification system, related to assisting a user to verify authenticity of a electronic entity including, including the steps of: creating a dynamic media; and verifying authenticity of such a electronic entity using such a dynamic media. It provides further including the step of protecting a dynamic media from unauthorized copying. The verification system further includes the steps of: providing a first aspect of such a electronic entity; and storing a second aspect of such a user; wherein such step of creating further includes the step of adapting such a first aspect and such a second aspect. It provides further including the step of: assisting such a user to select such a second aspect from a plurality of aspects, wherein such a plurality containing sufficient aspects to produce such a dynamic media that is probably unique; wherein such step of storing further includes the step of preventing such a electronic entity from storing any information that identifies such a user.

In accordance with another preferred embodiment hereof, this invention provides a verification system, related to assisting a electronic entity to verify authenticity of a user, including the steps of: assisting, during a registration period, a authenticating entity to store shared, among such at least such one user and such a authenticating entity, identification information about such a user, such identification information including a second public portion associated with a second secret portion; verifying authenticity of such a user using such identification information; assisting a authenticating entity to generate a token using a shared, among such a electronic entity and such a authenticating entity, cryptographic algorithm; electronically transmitting a token to such a user, wherein such a token includes a result of a shared, among such a electronic entity and such a authenticating entity, cryptographic algorithm; and assisting a electronic entity to verify authenticity of such a user using such a token and such a shared cryptographic algorithm. It provides such a secret portion includes a hardware identifier and a password. The verification system wherein such step of assisting to store further includes the step of prohibiting modification of such a hardware identifier. It provides such step of assisting to store further includes the step of preventing a electronic entity from storing any information that identifies such a user.

DETAILED DESCRIPTION OF THE BEST MODES AND PREFERRED EMBODIMENTS OF THE INVENTION

Figure 1:
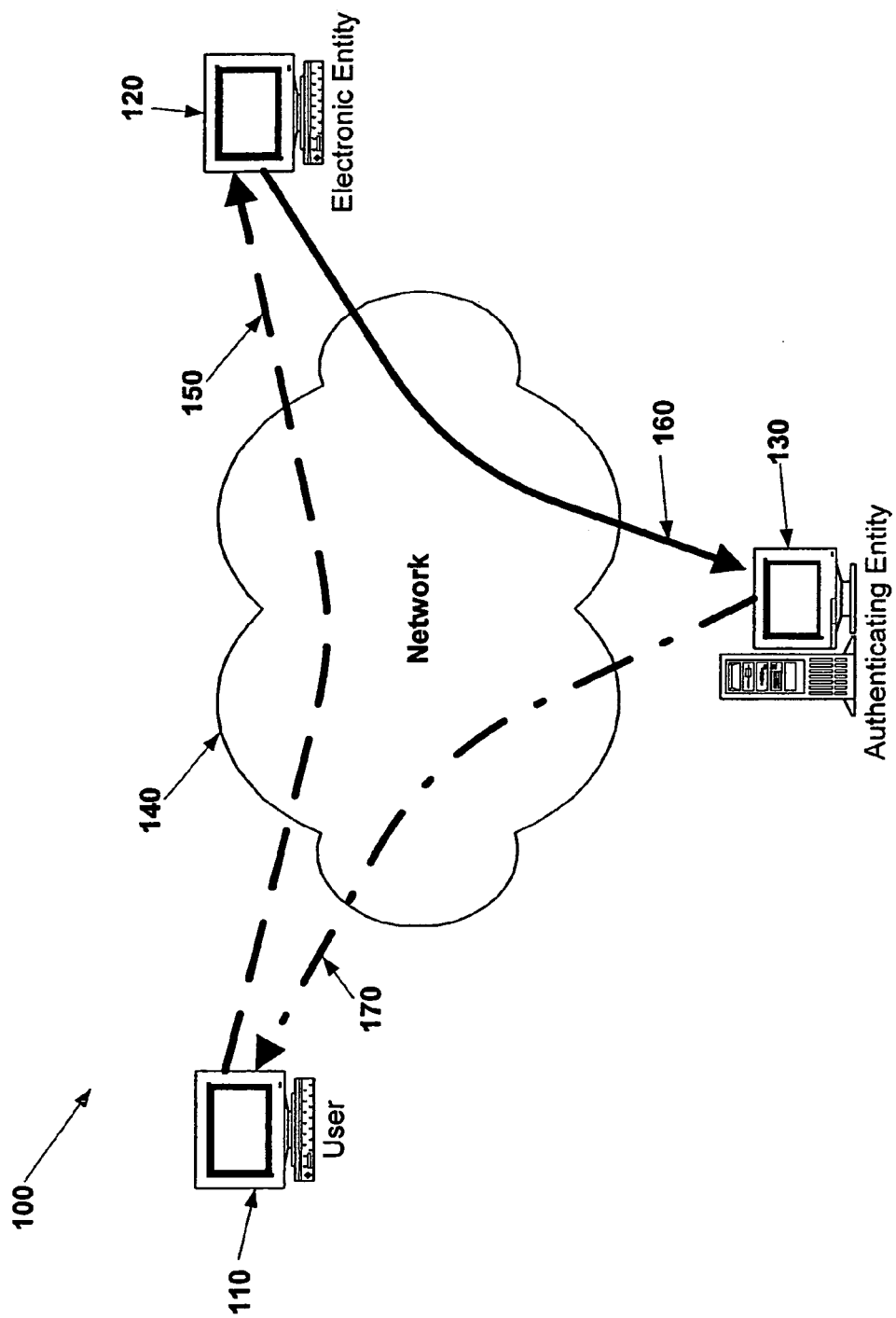
FIG. 1 shows a diagram view illustrating a user, an electronic entity and an authenticating entity communicating through a network according to a preferred embodiment of the present invention.

FIG. 1 shows a diagram view illustrating a user 110 (utilizing an electronic device), electronic entity 120 and authenticating entity 130. Preferably, electronic entity verification systems 100 allows user 110 to verify the authenticity of electronic entity 120 with the assistance of authenticating entity 130. Preferably, user 110, electronic entity 120, and authenticating entity 130 communicate electronically with each other through network 140, as shown. Preferably, network 140 comprises an Internet network. Upon reading the teachings of this specification, those with ordinary skill in the art will now understand that, under appropriate circumstances, considering such issues as advances in technology, user preference, etc., other network arrangements, for example, cellular phone network, public switched telephone network, or other electronic network, etc., may suffice. Preferably, user 110 uses an electronic device, preferably a computer, as shown, to communicate via network 140. Upon reading the teachings of this specification, those with ordinary skill in the art will now understand that, under appropriate circumstances, considering such issues as advances in technology, user preference, etc., other electronic device arrangements, for example, using a PDA, wireless phone, telephone or other electronic device adapted to transmit over electronic network 140, etc., may suffice. Preferably, electronic entity 120 comprises a website, as shown. Upon reading the teachings of this specification, those with ordinary skill in the art will now understand that, under appropriate circumstances, considering such issues as advances in technology, user preference, etc., other electronic entity arrangements, for example, electronic entity comprising an ATM machine, cellular phone, or any other electronic device that accepts electronic transactions across network, etc., may suffice. Preferably, authenticating entity 130 comprises equipment adapted to process authentication requests transmitted through network 140.

Preferably, before conducting transactions and submitting private information (for example, financial data, etc.), user 110 verifies authenticity (as herein described) of electronic entity 120 to help ensure that electronic entity 120 is legitimate and not, for example, a phishing website. Preferably, user 110 sends user authentication request 150 through network 140 to electronic entity 120, as shown. Preferably, upon receiving user authentication request 150, electronic entity 120 sends website authentication request 160 to authenticating entity 130, as shown. Preferably, authenticating entity 130 receives and processes website authentication request 160, as shown. Preferably, after receiving and analyzing website authentication request 160, authenticating entity 130 sends codeword 170 to user 110, as shown. Upon reading the teachings of this specification, those with ordinary skill in the art will now understand that, under appropriate circumstances, considering such issues as level of security required, convenience, etc., other codeword arrangements, for example, using a graphic, or other form of identifier, etc., may suffice. Preferably, authentication result 170 indicates to user 110 whether electronic entity 120 is authentic or not.

Figure 2:
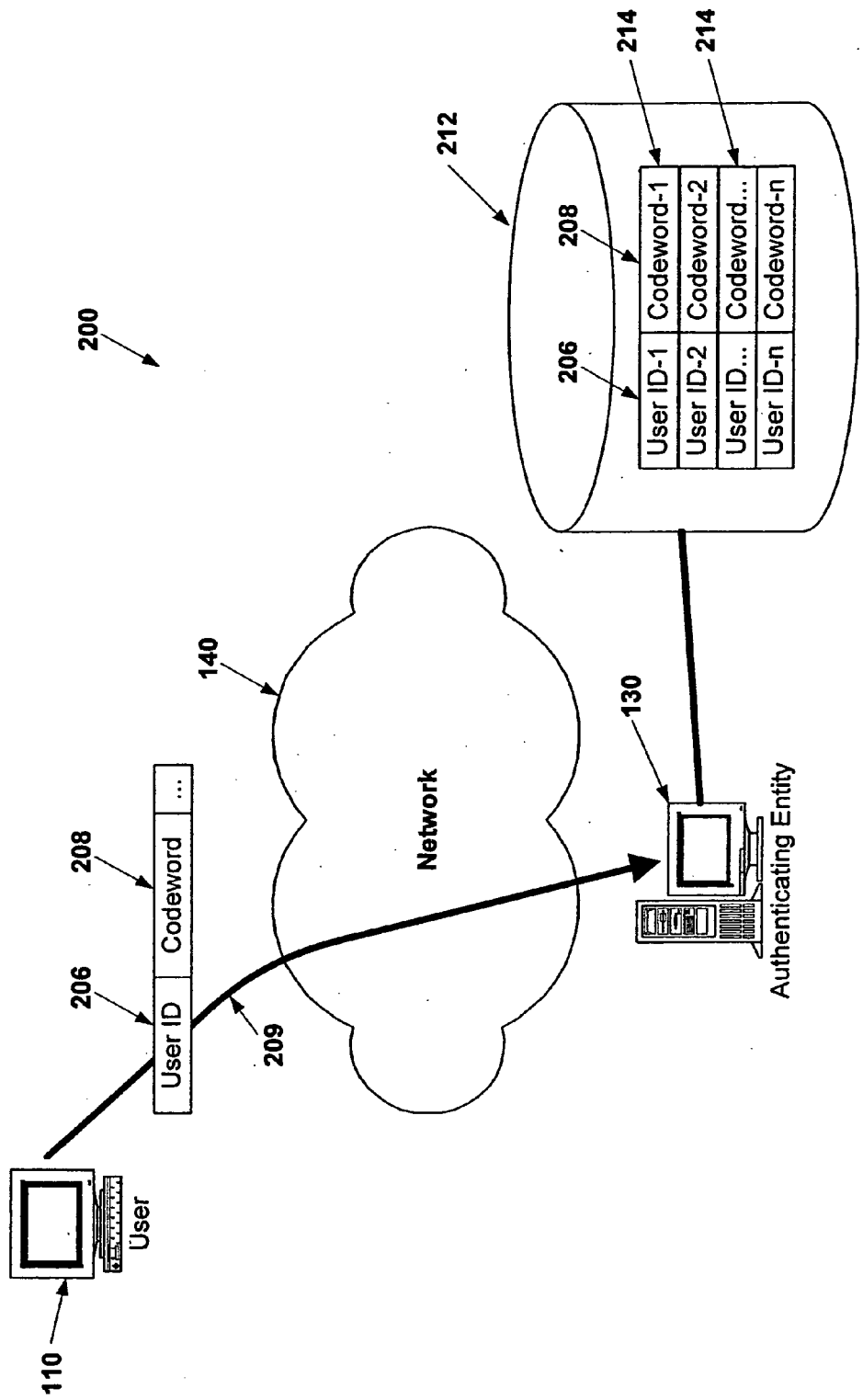
FIG. 2 shows a diagram view illustrating a user registering with an authenticating entity that maintains a database of users and associated codewords according to a preferred embodiment of the present invention.

FIG. 2 shows a diagram view illustrating the process of registering a user 110 according to a preferred embodiment of the present invention. Preferably, user registration 200 allows user 110 to create an account with authenticating entity 130 allowing user 110 to authenticate electronic entity 120. Preferably, user 110 visits website of authenticating entity 130. Preferably, user 110 transmits user registration request 209 to authenticating entity 130, as shown. Preferably, user registration request 209 comprises user ID 206 and codeword 208, as shown. Preferably, user registration request 209 is transmitted via network 140, as shown. Preferably, user ID 206 does not comprise information identifying user (such as, for example, user's social security number). Preferably, every user ID 206 is unique (preferably authenticating entity 130 keeps a database of all user IDs and does not permit duplicate user IDs to be created). Preferably, user ID 206 is memorized by user 110. Preferably, codeword 208 does not comprise information identifying user 110. Preferably, codeword 208 is easily recognizable to user 110. Preferably, authenticating entity 130 receives user registration request 209 from user 110 and then stores user ID 206 (at least embodying herein such second public portion of such second identification information about such at least one user) and codeword 208 (at least embodying herein such second secret portion of such second identification information about such at least one user) and any other information submitted by user 110 in user codeword database 212 (at least embodying herein assisting such at least one authenticating entity to store shared, among such at least such one user and such at least one authenticating entity, second identification information about such at least one user, such second identification information comprising at least one second public portion associated with at least one second secret portion). Preferably, user codeword database 212 comprises user codeword database records 214, as shown.

Figure 3:
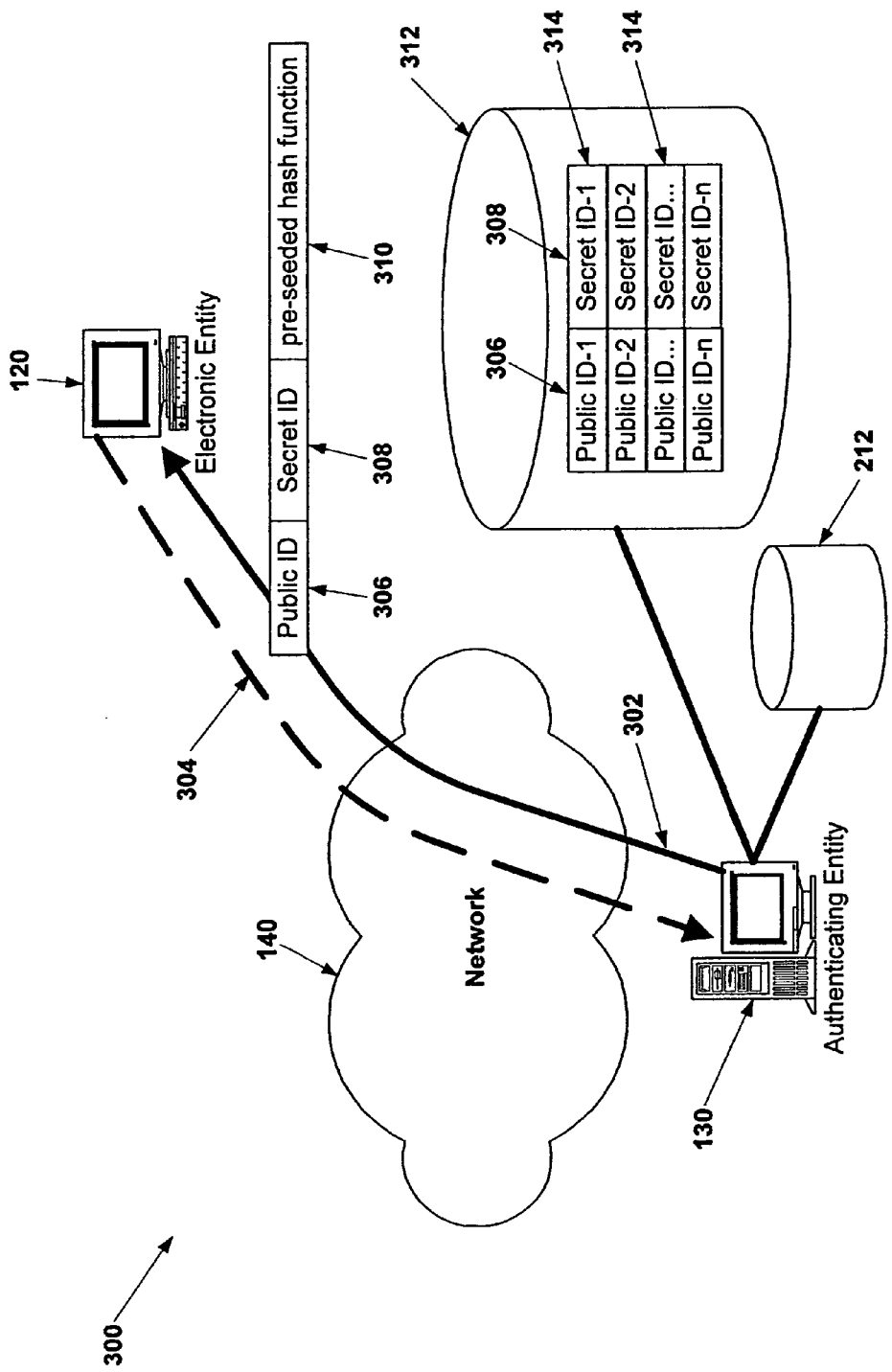
FIG. 3 shows a diagram view illustrating an electronic entity registering with an authenticating entity that maintains a database of electronic entity public IDs and associated electronic entity secret IDs according to a preferred embodiment of the present invention.

FIG. 3 shows a diagram view illustrating the process of registering an electronic entity according to a preferred embodiment of the present invention. Preferably, electronic entity registration 300 allows electronic entity 120 to create an account with authenticating entity 130 allowing later users to authenticate electronic entity 120. Preferably, electronic entity 120 transmits electronic entity registration request 304 to authenticating entity 130, as shown. Preferably, authenticating entity 130 investigates ownership of electronic entity 120 to determine legitimacy of electronic entity 120 (for example, to determine if electronic entity 120 is a phishing website or not). Preferably, authenticating entity 130 verifies legitimacy of electronic entity 120 by performing domain name lookups, trademark searches, internet protocol ownership lookups, and any other research necessary to prevent fraudulent registration of electronic entity 120. Preferably, if authenticating entity 130 determines that electronic entity 120 is a phishing website or other illegitimate site then authenticating entity 130 does not proceed with the registration process for electronic entity 120 and communication is terminated.

Preferably, if authenticating entity 130 determines that electronic entity 120 is a legitimate site, then authenticating entity 130 proceeds with the registration process. Preferably, authenticating entity 130 generates a unique public ID 306 and a unique secret ID 308 to associate with electronic entity 120. Preferably unique public ID 306 is generated by authenticating entity 130 by "hashing" the website IP address of electronic entity 120 using a hashing algorithm. Preferably unique secret ID 308 is generated by authenticating entity 130 by hashing the URL/website IP address of electronic entity 120 using a different hashing algorithm and/or different hashing seed than used to generate public ID 306. Upon reading the teachings of this specification, those with ordinary skill in the art will now understand that, under appropriate circumstances, considering such issues as level of security required, convenience, the requirement for uniqueness, etc., other Secret ID and Public ID arrangements, for example, other means of generating IDs, not using the IP address to generate the Secret ID and Public ID, randomly generating Secret ID and Public ID, etc., may suffice. Preferably, authenticating entity 130 responds to electronic entity registration request 304 by transmitting registration information 302 to electronic entity 120, as shown. Upon reading the teachings of this specification, those with ordinary skill in the art will now understand that, under appropriate circumstances, considering such issues as level of security required, haste required, expense, etc., other registration information transmission arrangements, for example, transmitting secret ID by means other than an electronic network, physical mail, secure direct connection, alternate network, etc., may suffice.

Preferably, registration information 302 comprises the public ID 306 and secret ID 308 which authenticating entity 130 has generated to associate with electronic entity 120. Preferably, secret ID 308 is known only to electronic entity 120 and authenticating entity 130, and is only transmitted after being hashed and encrypted as described below. Preferably, registration information 302 further comprises preseeded hash function 310 which enables electronic entity 120 to generate proper encryption for future transmissions to authenticating entity 130. Preferably, authenticating entity 130 stores user public ID 306 (at least embodying herein such first public portion of such first identification information about such at least one electronic entity) and secret ID 308 (at least embodying herein such first secret portion of such first identification information about such at least one electronic entity) and any other information submitted by electronic entity 120 in electronic entity database 312 (at least embodying herein assisting at least one authenticating entity to store shared, among such at least such one electronic entity and such at least one authenticating entity, first identification information about such at least one electronic entity, such first identification information comprising at least one first public portion associated with at least one first secret portion). Preferably, electronic entity database 312 comprises user electronic entity database records 314, as shown.

Figure 4:
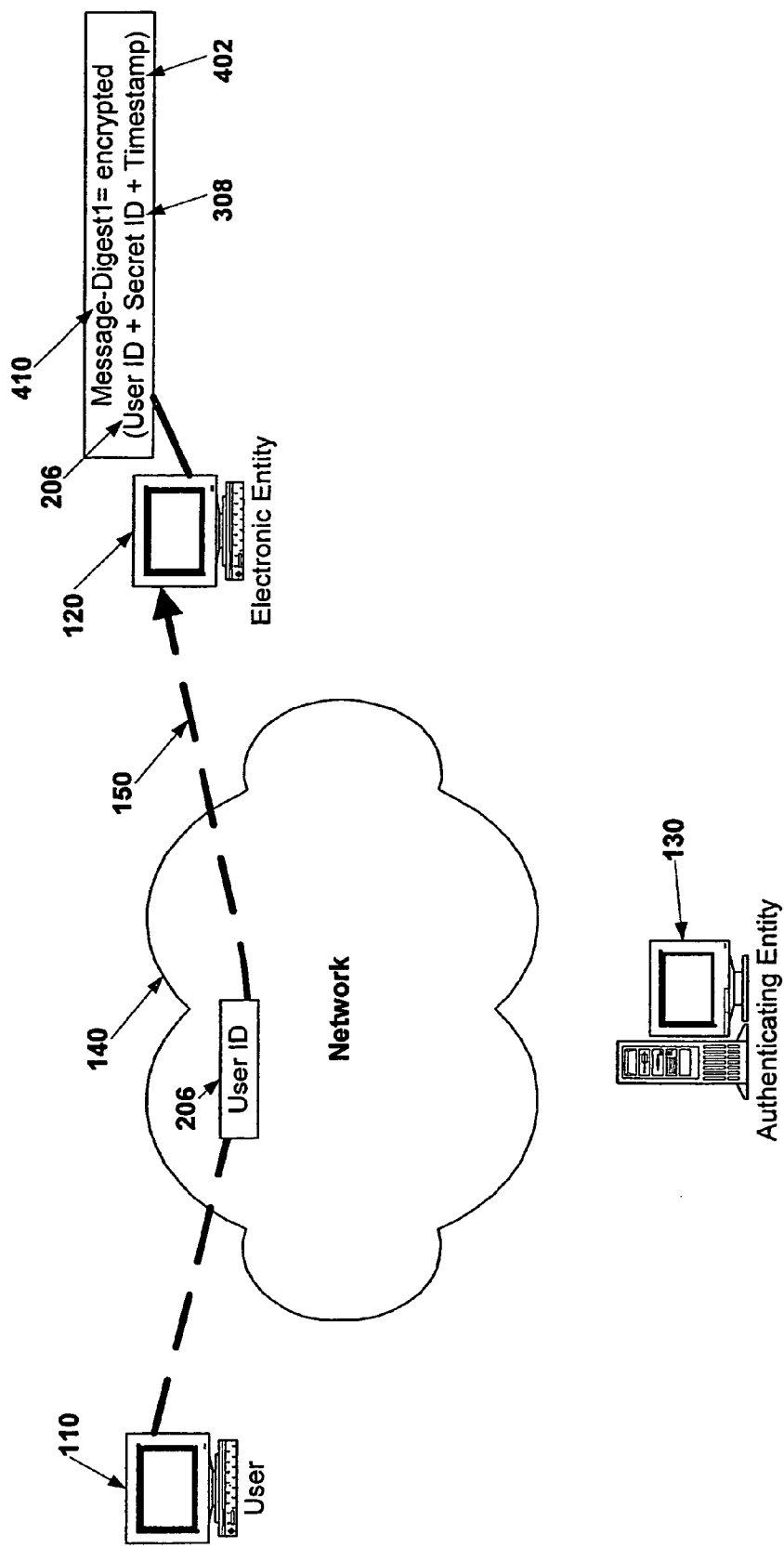
FIG. 4 shows a diagram view illustrating a user sending an authentication request through a network to an electronic entity according to a preferred embodiment of the present invention.

FIG. 4 shows a diagram view illustrating user 110 sending user authentication request 150 through network 140 to electronic entity 120 according to a preferred embodiment of the present invention. Preferably, user 110 sends user authentication request 150 through network 140 to electronic entity 120, as shown. Preferably, user authentication request 150 comprises user ID 206, as shown (at least embodying herein such at least one user electronically transmitting such at least one second public portion through at least one electronic network to such at least one electronic entity). Preferably, upon receiving user authentication request 150, electronic entity 120 composes message-digest1 410 (at least embodying herein such at least one electronic entity creating at least one first message digest by encrypting, using such cryptographic algorithm, data comprising such at least one first secret portion and such at least one second public portion). Preferably, message-digest1 410 is composed by encrypting a combination of user ID 206 (supplied by user 110), secret ID 308 (assigned to electronic entity 120 by authenticating entity 130), and timestamp 402 (which reflects the current time of the user authentication request 150, for example, "20040615051343" representing 5:13:43 am, Jun. 15, 2004).

Preferably, message-digest1 410 comprises timestamp 402 so that a significant delay in transmitting message-digest1 410 (for example, relaying message-digest1 410 via a "man-in-the-middle" phishing scheme) would result in effective expiration of message-digest1 410. Preferably encryption algorithm permits timestamp 402 to vary by a small range to allow a short transit time for message-digest1 410 to be transmitted from electronic entity 120 to authenticating entity 130. Preferably, the duration of timestamp change that will still provide identical encryptions of message-digest1 410 can be set by authenticating entity 130. Preferably, duration of timestamp change that will still provide identical encryptions of message-digest1 410 is about one second. Upon reading the teachings of this specification, those with ordinary skill in the art will now understand that, under appropriate circumstances, considering such issues as electronic network transit times, processor speeds, level of security, etc., other timestamp arrangements, for example, longer durations, such as two seconds, ten seconds, one minute, shorter durations, such as, 0.1 seconds, 0.01 seconds, other timestamp formats, etc., may suffice. Preferably, message-digest1 410 expires (encryption algorithm results change) after the duration set by authenticating entity 130 is exceeded.

Preferably, message-digest1 410 is encrypted using a pre-seeded, iterative, one-way implementation of a SHA-256 hash function which has been specified by authenticating entity 130. Upon reading the teachings of this specification, those with ordinary skill in the art will now understand that, under appropriate circumstances, considering such issues as improved cryptographic algorithms, processor speeds, level of security, etc., other encryption arrangements, for example, alternate algorithms, alternate encryption methods, etc., may suffice.

Figure 5:
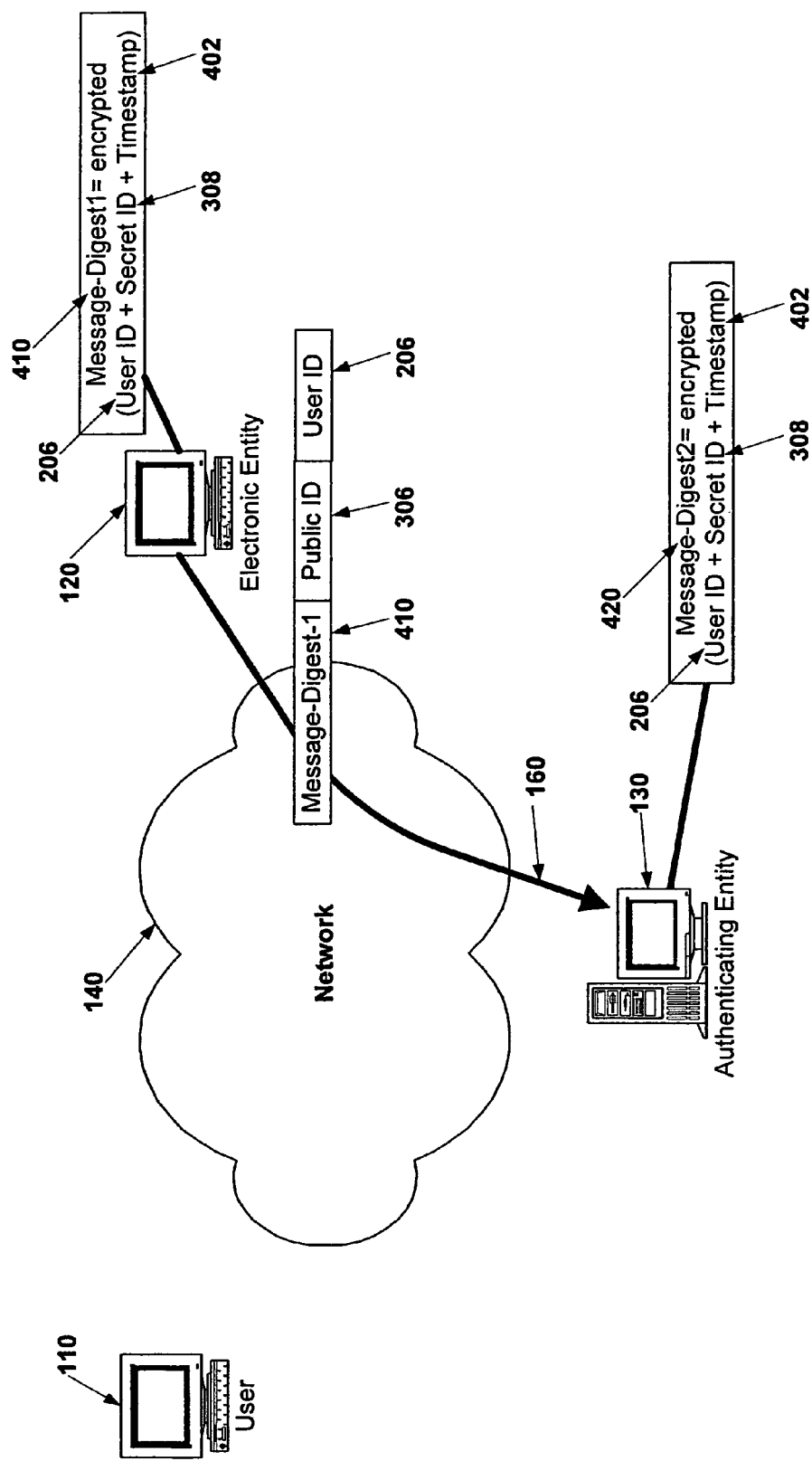
FIG. 5 shows a diagram view illustrating an electronic entity sending an authentication request through a network to an authenticating entity according to a preferred embodiment of the present invention.

FIG. 5 shows a diagram view illustrating electronic entity 120 sending entity authentication request 160 through network 140 to authenticating entity 130 according to a preferred embodiment of the present invention. Preferably, after composing message-digest1 410 as described above, electronic entity 120 sends entity authentication request 160 to authenticating entity 130, as shown. Preferably entity authentication request 160 comprises message-digest1 410, public ID 306, and user ID 206, as shown (at least embodying herein such at least one electronic entity transmitting such at least one first message digest to such at least one authenticating entity, and at least embodying herein such at least one electronic entity transmitting such at least one first public portion and such at least one second public portion to such at least one authenticating entity). Preferably, entity authentication request 160 does not include secret ID 308 (except as embedded within hashed/encrypted message-digest1 410).

Preferably, after receiving entity authentication request 160, authenticating entity 130 utilizes electronic entity database 312 to look up the secret ID 308 associated with the public ID 306 provided within entity authentication request 160 (at least embodying herein such at least one authenticating entity looking up such at least one first secret portion associated with such at least one first public portion). Preferably, authenticating entity 130 composes message-digest2 420 (at least embodying herein such at least one authenticating entity creating at least one second message digest by encrypting, using such cryptographic algorithm, data comprising such at least one first secret portion, and such at least one second public portion) by encrypting a combination of user ID 206 (provided within entity authentication request 160), secret ID 308 (looked up from electronic entity database 312), and timestamp 402, using the same algorithm used by electronic entity 120 to create message-digest1 410. Preferably, after composing message-digest2 420, authenticating entity 130 compares message-digest1 410 to message-digest2 420 (at least embodying herein such at least one authenticating entity comparing such at least one first message digest to such at least one second message digest).

Figure 6:
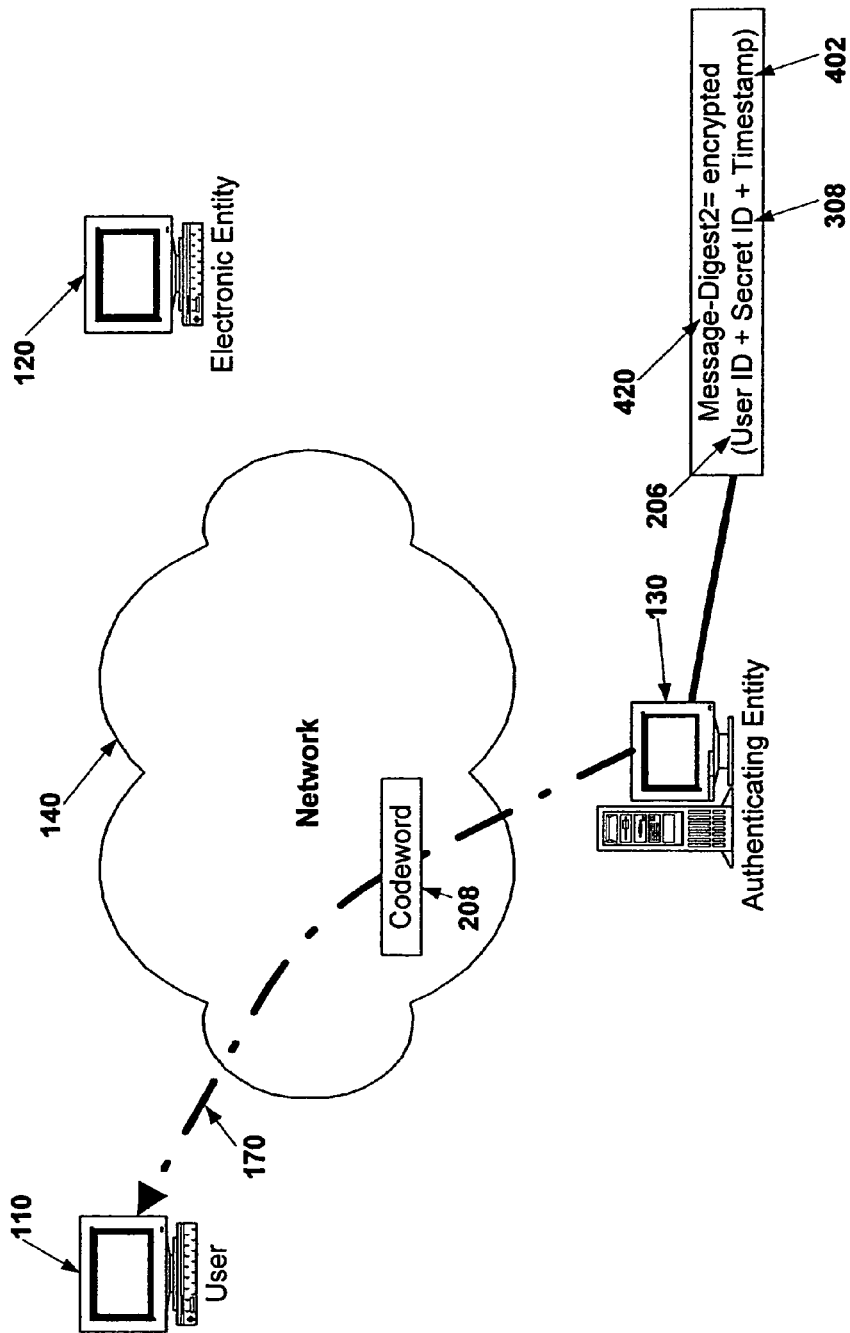
FIG. 6 shows a diagram view illustrating an authenticating entity sending an authentication result through a network to a user according to a preferred embodiment of the present invention.

FIG. 6 shows a diagram view illustrating authenticating entity 130 sending authentication result 170 (at least embodying herein notifying such at least one user of the result of the authenticity verification of such at least one electronic entity) through network 140 to user 110 according to a preferred embodiment of the present invention. If message-digest1 410 and message-digest2 420, as described above, are equivalent (indicating that electronic entity 120 had access to secret ID 308 and that message-digest1 410 was received before a significant change in timestamp 402) then authenticating entity 130 transmits authentication result 170 to user 110, preferably comprising codeword 208 (at least embodying herein verifying authenticity further comprises the step of such at least one authenticating entity transmitting such at least one second secret portion to such at least one user). If message-digest1 410 and message-digest2 420 do not match (indicating that something phishy may be going on) then authenticating entity 130 transmits authentication result 170 to user 110, preferably comprising a bogus codeword (not the correct codeword). The above at least embodies herein verifying authenticity of such at least one electronic entity using at least one shared, among such at least one electronic entity and such at least one authenticating entity, cryptographic algorithm. Upon reading the teachings of this specification, those with ordinary skill in the art will now understand that, under appropriate circumstances, considering such issues as user preference, level of security, etc., other authentication result arrangements, for example, warning messages, etc., may suffice.

Figure 7:
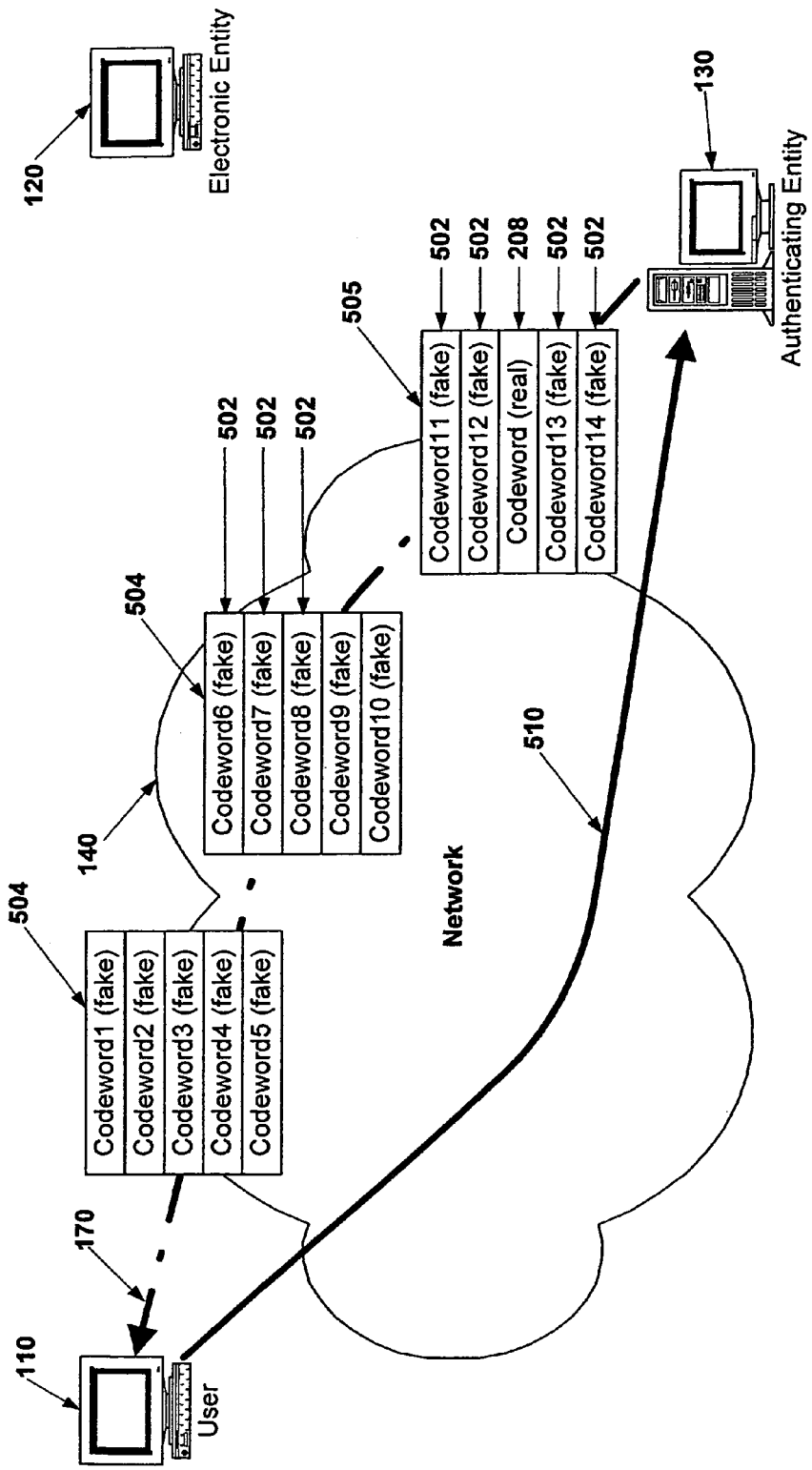
FIG. 7 shows a diagram view illustrating an authenticating entity sending an authentication result through a network to a user according to an alternate preferred embodiment of the present invention.

FIG. 7 shows a diagram view illustrating authenticating entity 130 sending authentication result 170 through network 140 to user 110 according to an alternate preferred embodiment of the present invention. According to an alternate preferred embodiment of the present invention authentication result 170 may comprise transmitting a plurality of bogus codewords 502 (at least embodying herein such at least one authenticating entity transmitting to such at least one user at least one bogus codeword). Preferably, authenticating entity 130 transmits multiple codeword lists 504 (at least embodying herein such at least one authenticating entity transmitting to such at least one user a plurality of lists comprising bogus codewords) of bogus codewords 502 to user 110. Preferably, to confirm the authenticity of user 110, user 110 must select (from among multiple codeword lists 504 of codewords 502) the "correct" list 505. The "correct" list 505 is the list which contains the "correct" codeword (codeword 208). Preferably, there is only one "correct" list 505. Preferably, user 110 must select the "correct" list 505 and transmit response 510 back to authenticating entity 130 within a specified time limit established by authenticating entity 130.

Figure 8:
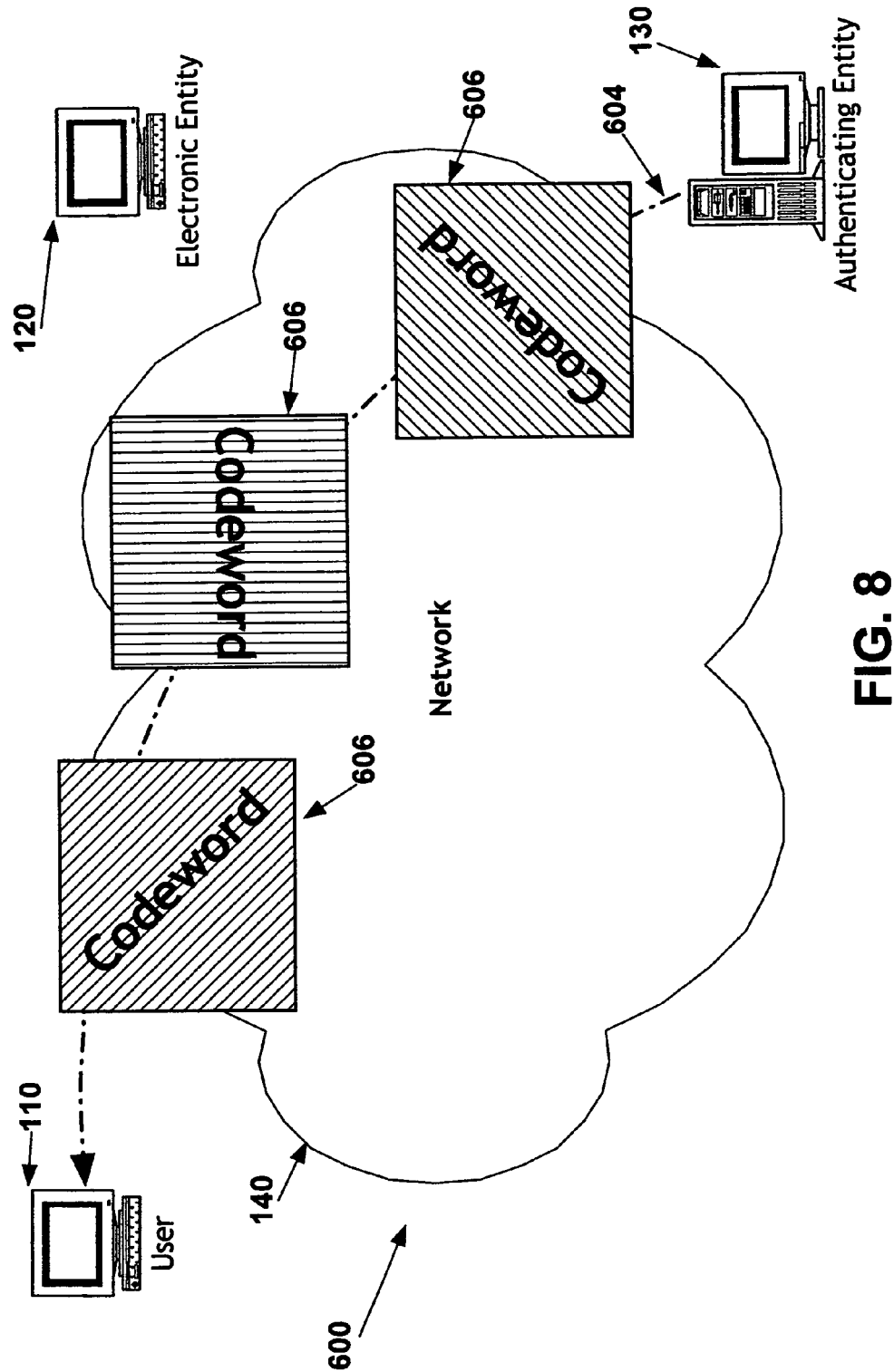
FIG. 8 shows a diagram view illustrating an authenticating entity sending a dynamic media through a network to a user according to yet another preferred embodiment of the present invention.

FIG. 8 shows a diagram view illustrating authenticating entity 130 sending dynamic media 606 through network 140 to user 110 according to yet another preferred embodiment of the present invention. Preferably, behavior-based authentication system 600 provides user 110 with dynamic media 606, which is probably unique (because of the statically large number of possible behaviors and aspects of dynamic media 606) to user 110, to reassure user that verification was successful. Preferably, authenticating entity 130 determines authentication result 170, and sends authentication transmission 604. Preferably, if authentication result 170 does not confirm the authenticity of electronic entity 120, authenticating entity 130 may indicate failure in authentication transmission 604. Alternately preferably, if authentication result 170 does not confirm the authenticity of electronic entity 120, authenticating entity 130 may send bogus dynamic media in authentication transmission 604. Preferably, if authentication result 170 does confirm the authenticity of electronic entity 120, authenticating entity 130 may transmit dynamic media 606 in authentication transmission 604, as shown. Preferably, user 110 recognizes the behavior of dynamic media 606. Preferably, the behavior of dynamic media 606 would be difficult to predict and/or duplicate (at least embodying herein verifying authenticity of such at least one electronic entity using such at least one dynamic media).

Preferably, during user registration 200, user 110 specifies dynamic media 606, such specification is stored in user codeword database 212 associated with user ID 206. Preferably, user 110 specifies dynamic media 606 such that user 110 will easily recognize the behavior of dynamic media 606 as a probably unique behavior specified by user 110. Preferably, authenticating entity 130 provides user 110 with various aspects of behavior, which may be adapted to dynamic media 606. For example, one aspect of dynamic media 606 could be the beginning and ending background color; another aspect of dynamic media could be beginning and ending foreground color; another aspect of dynamic media could be effects, for example, zooming, rotating, waving, spinning, falling snowflakes, morphing from one image to another, etc.; another aspect of dynamic media 606 could be a ticker tape scrolling. Preferably, user 110 would select from various aspects to determine dynamic media 606 (at least embodying herein assisting such at least one user to select such at least one second aspect from at least one plurality of aspects, wherein such at least one plurality containing sufficient aspects to produce such at least one dynamic media that is probably unique.) Preferably, user 110 would provide additional aspects. For example, user provided aspects could include codeword 208; other user specified words; family pictures; other meaningful images; voice recording; other meaningful sounds; etc. Upon reading the teachings of this specification, those with ordinary skill in the art will now understand that, under appropriate circumstances, considering such issues as new industry standards, new Internet RFCs, improved network protocols, improved media formats, improved rendering devices, improved display devices, etc., other aspects, for example, random aspects, third-party filters, new effects, aspects of other senses, etc., may suffice.

In an alternate preferred embodiment, only the electronic entity 120 and the user 110 are required. Preferably, electronic entity 120 can provide and/or store aspects of dynamic media 606 (at least embodying herein providing at least one first aspect of such at least one electronic entity; and at least embodying herein storing at least one second aspect of such at least one user; and at least embodying herein adapting such at least one first aspect and such at least one second aspect.) Preferably, electronic entity 120 does not associate any user-identifying information with dynamic media 606 (see discussion of Swiss-type numbered bank account, infra) (at least embodying herein preventing such at least one electronic entity from storing any information that identifies such at least one user).

Preferably, user-contributed aspects and authenticating-entity-contributed aspects would be combined to create dynamic media 606. For example, dynamic media 606, as illustrated, comprises a beginning background color, intermediate background color, and ending background color, a rotating aspect, and a codeword. (at least embodying herein creating at least one dynamic media). Alternately preferably, user 110, for example, may wish to see their codeword "bounce" around the screen, or may wish to have their codeword spin in circles while fading from black to blue. Preferably, the number of possible behavior permutations of combinations of aspects is statistically large. For example, if in a preferred embodiment of this invention behavior based authentication system 600 provides for twenty user-selectable codeword behavior choices, then varying combination of these behavior choices would result in 20! (20 prime) possible permutations, or 2,432,902,008,176,640,000 different behaviors and aspects. Preferably, with only twenty user-selectable codeword behavior choices, a phisher would be faced with a statistically large number of codeword display behaviors the phisher must be able to instantly, or automatically, replicate in order to fool victims. Preferably, since phishers rely on a large pool of potential victims, increasing the complexity of the phishers task significantly decreases the phisher's ability to fool victims. Preferably, such task would make falsifying dynamic media 606 virtually impossible for the phisher to accomplish on a profitable scale. Preferably, if the phisher were able to somehow accomplish this task, using automation or some form of visual-recognition/artificial intelligence based automation, authenticating entity 130 would provide additional aspects and behavior choices to increase the possibilities, increasing the total number of permutations to 51,090,942,171,709,440,000, roughly 25 times as many more permutations than before. Preferably, if the authenticating entity were to add 2 additional behavior choices instead of just 1, the number of permutation possibilities jumps to 1,124,000,727,777,607,680,000, or more than 562 times more permutations than before, and so on.

Preferably, with the high number of possible aspects and behavior permutations, replicating the correct behavior combination easily and in a timely manner becomes impossible for the phisher. Preferably, user 110 will be able to recognize their unique behavior easily and swiftly.

Preferably, dynamic media 606 includes at least three Macromedia Flash objects. Upon reading the teachings of this specification, those with ordinary skill in the art will now understand that, under appropriate circumstances, considering such issues as new industry standards, new Internet RFCs, improved network protocols, improved media formats, improved rendering devices, improved display devices, etc., other dynamic media, for example, QuickTime movies, audio streams, Windows media format, other video encoding and streaming formats, audio encoding formats, etc., may suffice.

Preferably, the first Flash object is embedded in the web page and contains no information related to dynamic media 606. Preferably, the first Flash object does contain a reference to the second Flash object, whereby the first Flash object attempts to load dynamic media 606 from the second Flash object. Preferably, the second Flash object contains a formula for combining aspects of dynamic media 606. Preferably, the second Flash object does not contain dynamic media 606, but composes dynamic media 606. Preferably, the second Flash object is provided references to the third and subsequent flash objects. Preferably, the second Flash object will not transmit dynamic media 606 to the first Flash object until the second Flash object has deleted the third and subsequent Flash objects. Preferably, the third and subsequent Flash objects are randomly named and contain the various aspects of dynamic media 606. Preferably, all Flash objects are obfuscated by encryption or other means. Preferably, such steps make it difficult to copy, directly or indirectly, dynamic media 606. Upon reading the teachings of this specification, those with ordinary skill in the art will now understand that, under appropriate circumstances, considering such issues as new industry standards, new Internet RFCs, improved network protocols, improved media formats, improved rendering devices, improved display devices, etc., other copy protection methods may suffice.

Preferably, behavior-based authentication system 600 is a new type of authentication factor. Preferably, Behavior-Based authentication is related to the ID-Based biometric approach. Preferably, behavior-based authentication system 600 embodies the principle that there are some things, i.e. "behaviors", that are probably unique to a specific individual and, preferably, probably uniquely identifiable by a specific individual, for example, nobody can play the piano exactly like Bach. Preferably, user 110 can identify Bach's work by recognizing aspects of the work. Preferably, user 110 can similarly recognize their own past work.

Preferably, user 110 can engage in nearly limitless behaviors. In one embodiment of this invention, user 110 must distinguish lists of false or "bogus" codewords from a list containing one valid codeword predetermined by user 110. The ability to detect correct codewords from lists of false codewords is one type of human behavior.

In another preferred embodiment, another example of behavior-based authentication, user 110 designs a series of probably unique instructions (for example, the discussion of dynamic media above) which they wish the authenticating entity to execute related to their codeword. Preferably, user 110 will recognize such probably unique instructions as authentic because user 110 ordered their creation. Preferably, behavior-based authentication system 600, electronic entity verification systems 100 may further frustrate "Man in the middle" (MIM) phishing attacks, which take advantage of knowledge-based authentication approaches. Preferably, phisher (aka, the man in the middle) will be unable to easily or timely recreate dynamic media 606 of user 110, his attack fails. For example, if the phisher obtains user ID 206 and submits user ID 206 to electronic entity 120 to obtain dynamic media 606, dynamic media 606 demonstrates display behaviors which user 110 easily anticipates but the phisher is unable to easily or timely recreate. Preferably, such phisher (MIM) will be unaware of the unique nature of dynamic media 606, unless such phisher (MIM) actually views dynamic media 606.

Figure 9:
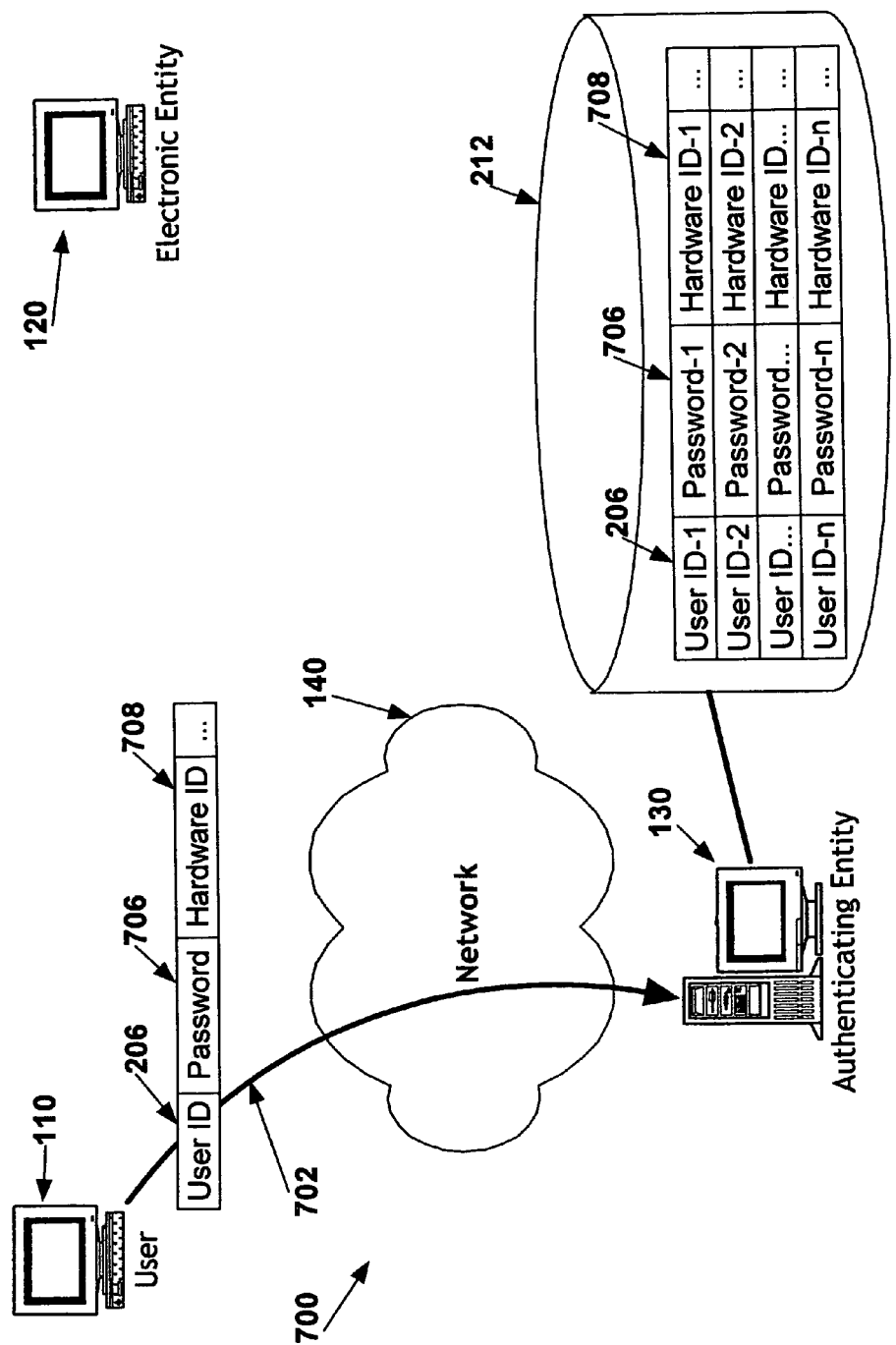
FIG. 9 shows a diagram view illustrating an authenticating entity verifying a user's password according to still another alternate preferred embodiment of the present invention.

FIG. 9 shows a diagram view illustrating authenticating entity 130 verifying password of user 110 according to still another alternate preferred embodiment of the present invention. Preferably, after user 110 has received verification (by codeword, a series of codeword lists, dynamic media, or any other method) that electronic entity 120 is authentic, authenticating entity may display virtual token system 700 to user 110, as shown. Preferably, user 110 would like to authenticate to the bank by two-factor authentication. Preferably, virtual token system 700 would provide an object-based factor to user 110. Preferably, electronic entity 120 could then perform multi-factor authentication, such as for example, two-factor authentication including object-based and knowledge-based factors.

Preferably, to obtain token 712 (see FIG. 10 below), user 110 would send password authentication request 702, including, for example, user ID 206, password 706 and hardware identifier 708, to authenticating entity 130, as shown. Preferably, password 706 and hardware identifier 708 are shared by user 110 during user registration 200. Preferably, user ID 206 is associated (and preferably stored) with password 706 and hardware identifier 708 in user codeword database 212 (at least embodying herein assisting, during at least one registration period, at least one authenticating entity to store shared, among such at least such one user and such at least one authenticating entity, identification information about such at least one user, such identification information comprising at least one second public portion associated with at least one second secret portion, and at least embodying herein such at least one secret portion comprises at least one hardware identifier and at least one password), as shown. Upon reading the teachings of this specification, those with ordinary skill in the art will now understand that, under appropriate circumstances, considering such issues as improved cryptographic algorithms, new authentication factors, new industry standards etc., other password authentication request, for example, biometric authentication, eye-scanners, fingerprint scanning, obscure personal-historical questions (e.g. What is your mother's maiden name?), etc., may suffice.

Preferably, during user registration 200, authenticating entity 130 provides user 110 with a web-browser cookie, which can be used as hardware identifier 708. Preferably, such web-browser cookie, including the name and the contents, is preferably unique to user 110, preferably encrypted, and/or preferably, obfuscated. Preferably, authenticating entity 130 prevents modification of hardware identifier 708 that is stored in user codeword database 212. Alternately preferably, authenticating entity provides a one-use URL for resetting the web-browser cookie, which can be used as hardware identifier 708 (at least embodying herein prohibiting modification of such at least one hardware identifier). Upon reading the teachings of this specification, those with ordinary skill in the art will now understand that, under appropriate circumstances, considering such issues as level of security, new industry standards, new electronic device components, new methods of numbering or identifying electronic devices etc., other hardware identifiers, for example, a computer processor identifiers, network card MAC addresses, cellular phone EIN numbers, etc., may suffice.

Preferably, password 706 includes a 4 digit pin, for example, the 4 digit pin widely adopted in financial services institutions. Preferably, user 110 must click using a mouse the 4 digit pin, to help prevent trojan keyloggers (a type of malicious software program that monitors keyboard events and attempts to determine passwords) from determining password 706 by monitoring keystroke events. Preferably, no information stored in user codeword database 212 can be used to identify user 110. Preferably, all information stored in user codeword database 212 is anonymous, for example, like an anonymous, Swiss-type, numbered bank account (at least embodying herein preventing at least one electronic entity from storing any information that identifies such at least one user).

Preferably, such authentication credentials, including user ID 206, password 706 and hardware identifier 708, are transmitted through network 140, as shown. Preferably, authenticating entity 130 accepts such authentication credentials, including user ID 206, password 706 and hardware identifier 708, are transmitted through network 140, as shown. Preferably, authenticating entity 130 compares password 706 transmitted (at least embodying herein verifying authenticity of such at least one user using such identification information) by user 110 with password 706 previously stored in user codeword database 212. Preferably, authenticating entity does not provide token 712 if password 706 transmitted by user 110 does not match password 706 previously stored in user codeword database 212. Preferably, if password 706 transmitted by user 110 does match password 706 previously stored in user codeword database 212, then authenticating entity 130 generates token 712. Preferably, token 712 is composed by encrypting a combination of user ID 206, secret ID 308, and timestamp 402. Preferably, token 712 is encrypted using a pre-seeded, iterative, one-way implementation of a SHA-256 hash function which has been specified by authenticating entity 130. Preferably, token 712 is truncated to six digits, for example, as hardware token devices provide as well-known industry standard in the financial services industry (at least embodying herein such at least one token comprises at least one result of at least one shared, among such at least one electronic entity and such at least one authenticating entity, cryptographic algorithm; and at least embodying herein assisting at least one authenticating entity to generate at least one token using at least one shared, among such at least one electronic entity and such at least one authenticating entity, cryptographic algorithm). Upon reading the teachings of this specification, those with ordinary skill in the art will now understand that, under appropriate circumstances, considering such issues as improved cryptographic algorithms, processor speeds, level of security, new industry standards, etc., other token arrangements and other encryption algorithms, for example, a pre-determined list of random numbers, alternate algorithms, alternate encryption methods, etc., may suffice.

Figure 10:
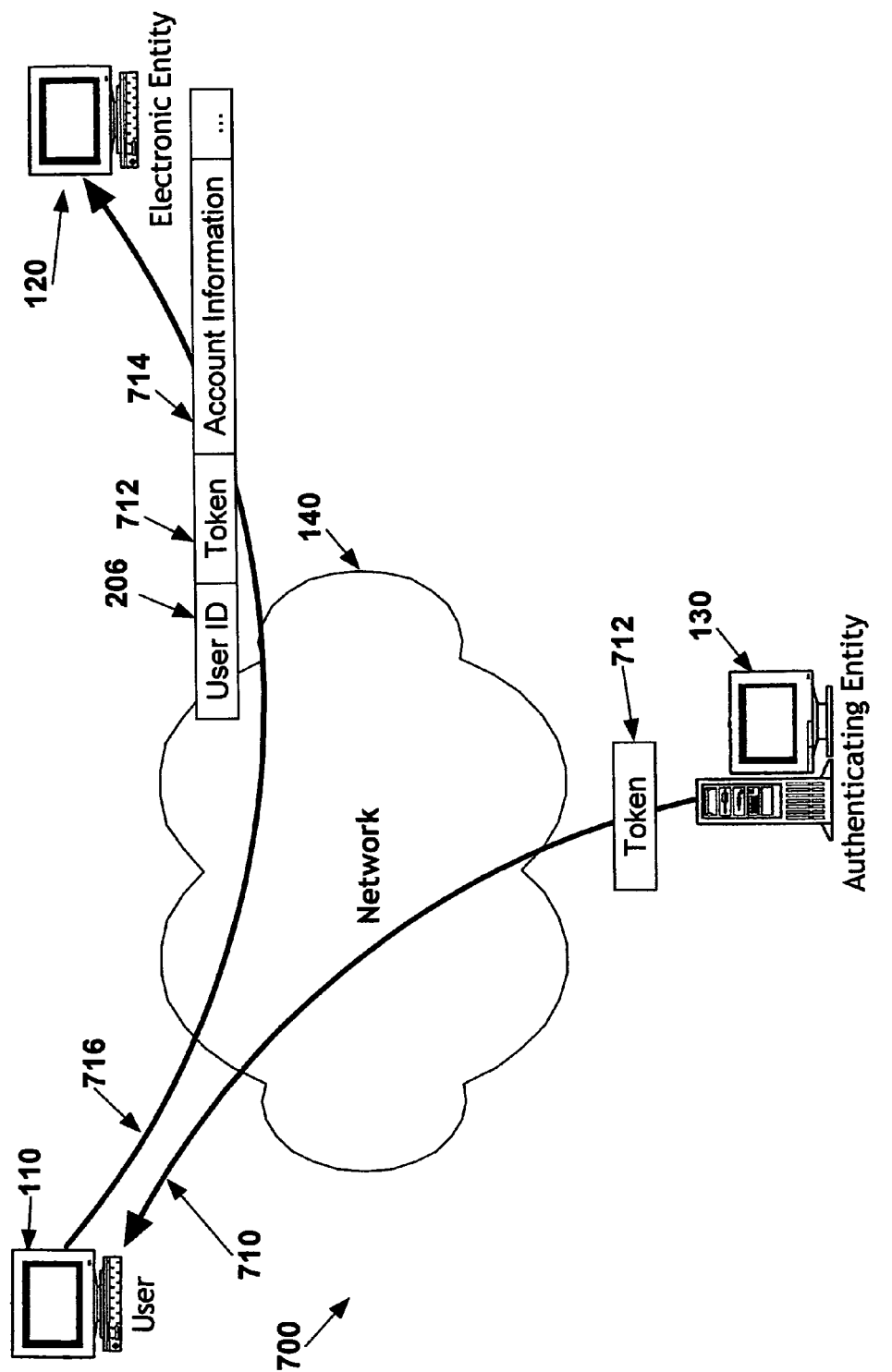
FIG. 10 shows a diagram view illustrating an authenticating entity sending a token through a network to a user according to an alternate preferred embodiment of the present invention.

FIG. 10 shows a diagram view illustrating authenticating entity 130 sending token 712 through network 140 to user 110 according to an alternate preferred embodiment of the present invention. Preferably, authenticating entity 130 sends pin authentication response 710 to user 110. Preferably, if authentication was not successful, token 712 is not transmitted. Preferably, if authentication is successful, token 712 is transmitted, as shown.

Preferably, user 110 can then send user-authentication request 716. Preferably user-authentication request 716 includes user ID 206 and token 712 to electronic entity 120, as shown. Preferably, user 110 can simultaneously submit account information 714, including authentication information specific to electronic entity 120, as shown. Preferably, secret ID 308 is previously known to electronic entity 120. Preferably, account information 714 will include at least one other factor for authentication, for example, a username/password combination used in knowledge-based authentication. Preferably, electronic entity 120 performs a multi-factor authentication. Preferably, electronic entity 120 uses user-authentication request 716 and secret ID 308 to calculate the expected value for token 712 by using the same, shared cryptographic algorithm used by authenticating entity 130, as described just above. Preferably, if the expected value for token 712 matches token 712 supplied by user during user-authentication request 716, and any other authentication required by electronic entity 120 is also successful, then electronic entity 120 can verify the authenticity of user 110 (at least embodying herein assisting at least one electronic entity to verify authenticity of such at least one user using such at least one token and such at least one shared cryptographic algorithm).

Preferably, virtual token system 700 allows object-based authentication without possession of a physical device. Preferably, even if a phisher were to trick user 110 into sharing user ID 206, password 706, codeword 208, and account information 714, such phisher could not obtain access to the account because user 110, does not know, and probably cannot determine hardware identifier 708.

This application hereby incorporates by reference material on a compact disk containing the file named source.txt, created on Feb. 20, 2006, having 17,995 bytes.

Further, many other advantages of applicant's invention will be apparent to those skilled in the art from the above descriptions and the below claims.

What is claimed is:

1. A verification method, related to assisting at least one user using at least one web-browser on at least one computer to verify authenticity with at least one website, comprising the steps of:

storing by at least one authenticating entity, during at least one first registration period, first identification information about the at least one website, wherein the first identification information is shared among the at least one website and the at least one authenticating entity, the first identification information comprising at least one first public portion associated with at least one first secret portion;

b. storing by the at least one authenticating entity, during at least one second registration period, second identification information about the at least one computer of the at least one user, identification information is shared among the at least one computer and the at least one authenticating entity, the second identification information comprising at least one hardware identifier of the computer of the user and at least one second public portion associated with at least one second secret portion; and c. providing via the at least one authenticating entity, during the at least one second registration period, a cookie to the at least one web-browser of the at least one computer;

verifying authenticity of the at least one website using at least one shared, among the at least one website and the at least one authenticating entity, cryptographic algorithm, wherein the step of verifying authenticity further comprises the step of i) the at least one computer electronically transmitting the at least one second public portion through the at least one public computer network to the at least one website, ii) the at least one website creating at least one first message digest by encrypting, using the cryptographic algorithm, data comprising the at least one first secret portion and the at least one second public portion, and iii) the at least one website transmitting the at least one first message digest through the at least one public computer network to the at least one authenticating entity;

authenticating entity, cryptographic algorithm;

e. wherein the at least one computer, the at least one website and the at least one authenticating entity communicate across the at least one public computer network.

2. The verification method according to claim 1 wherein the step of verifying authenticity further comprises the steps of:
   a. the at least one website transmitting the at least one first public portion and the at least one second public portion through the at least one public computer network to the at least one authenticating entity;
   b. the at least one authenticating entity identifying the at least one first secret portion associated with the at least one first public portion;
   c. the at least one authenticating entity creating at least one second message digest by encrypting, using the cryptographic algorithm, the data comprising the at least one first secret portion and the at least one second public portion.

3. The verification method according to claim 2 wherein the step of verifying authenticity further comprises the step of the at least one authenticating entity comparing the at least one first message digest to the at least one second message digest.

4. The verification method according to claim 3 wherein the step of verifying authenticity further comprises the step of notifying the at least one user of a result of the authenticity verification of the at least one website.

5. The verification method according to claim 4 wherein the step of notifying further comprises the steps of:
   a. creating at least one dynamic media using at least one aspect; and
   b. transmitting the at least one dynamic media through the at least one public computer network to the at least one computer;
   c. wherein the at least one second secret portion further comprises the at least one aspect.

6. The verification method according to claim 4 further comprising the steps of:
   a. verify authenticity of the at least one user by the at least one authenticating entity using at least one portion of the at least one second identification information and the at least one hardware identifier and the cookie;
   generating at least one token using the at least one shared cryptographic algorithm for the at least one authenticating entity;
   c. electronically transmitting the at least one token through the at least one public computer network to the at least one computer; and
   d. verify authenticity of the at least one user using the at least one token and the at least one shared cryptographic algorithm for the at least one website.

7. The verification method according to claim 6 wherein the step of assisting to store the at least one second identification information about the at least one computer further comprises the steps of:
   a. prohibiting the at least one website from storing any information that identifies the at least one user as the at least one second identification information; and
   b. preventing the at least one authenticating entity from storing any information that identifies the at least one user as the at least one second identification information.

8. The verification method according to claim 1 wherein the step of verifying authenticity further comprises the step of the at least one authenticating entity transmitting the at least one second secret portion to the at least one computer.

9. The verification method according to claim 1 wherein the step of verifying authenticity comprises the steps of:
   a. creating at least one dynamic media using at least one aspect; and
   b. transmitting the at least one dynamic media to the at least one computer;
   c. wherein the at least one second secret portion further comprises the at least one aspect.

10. The verification method according to claim 1 wherein the step of verifying authenticity comprises the steps of:
   a. verifying authenticity of the at least one user using the at least one second identification information, the hardware-identifier, and the cookie stored in the at least one web-browser;
   b. generating at least one token using the at least one shared cryptographic algorithm for the at least one authenticating entity;
   c. electronically transmitting the at least one token through the at least one public computer network to the at least one computer; and
   d. verify authenticity of the at least one user using the at least one token and the at least one shared cryptographic algorithm for the at least one website.

* * * * *